United States Patent
Windham

(10) Patent No.: US 10,661,691 B2
(45) Date of Patent: May 26, 2020

(54) INTEGRATED SEAT BACK SUPPORT MEMBER FOR SEAT ASSEMBLIES

(71) Applicant: Lear Corporation, Southfield, MI (US)

(72) Inventor: Norman Windham, Ginsheim Gustavsburg (DE)

(73) Assignee: Lear Corporation, Southfield, MI (US)

( * ) Notice: Subject to any disclaimer, the term of this patent is extended or adjusted under 35 U.S.C. 154(b) by 171 days.

(21) Appl. No.: 15/617,553

(22) Filed: Jun. 8, 2017

(65) Prior Publication Data

US 2018/0043808 A1 Feb. 15, 2018

(30) Foreign Application Priority Data

Aug. 12, 2016 (DE) ........................ 10 2016 215 048

(51) Int. Cl.
*B60N 2/68* (2006.01)
*B60N 2/64* (2006.01)
(Continued)

(52) U.S. Cl.
CPC ................ *B60N 2/68* (2013.01); *B60N 2/64* (2013.01); *B60N 2/803* (2018.02); *B60N 2/809* (2018.02);
(Continued)

(58) Field of Classification Search
CPC .......... B60N 2/68; B60N 2/686; B60N 2/894; B60N 2/897; B60N 2/809; B60N 2/99;
(Continued)

(56) References Cited

U.S. PATENT DOCUMENTS 3,134,627 A 5/1964 Mason
3,147,997 A 9/1964 Mason
(Continued)

FOREIGN PATENT DOCUMENTS

CN 102205809 A 10/2011
DE 102012204813 B4 9/2013
(Continued)

OTHER PUBLICATIONS

Chinese Office Action for Application No. 201710388591.8, dated May 7, 2019, 11 pages.
(Continued)

*Primary Examiner* — Kyle J. Walraed-Sullivan
(74) *Attorney, Agent, or Firm* — Brooks Kushman P.C.

(57) ABSTRACT

A seat assembly is provided with a seat back support member with a primary substrate received upon an upper cross member and a pair of side members of a seat back frame to support a back of an occupant. A pair of receptacles is formed through the primary substrate to receive a pair of posts that extend from the upper cross member of the seat back frame. A secondary substrate extends from the primary substrate to support a head of the occupant. A method of assembling a seat assembly determines whether the seat assembly comprises one of an adjustable head restraint assembly and an integrated head restraint. The adjustable head restraint assembly is assembled upon the pair of posts in response or a seat back support member with a pair of apertures formed therethrough is assembled upon the upper cross member with the pair of posts received in the pair of apertures.

20 Claims, 4 Drawing Sheets

(51) Int. Cl.
*B60N 2/809* (2018.01)
*B60N 2/803* (2018.01)
*B60N 2/90* (2018.01)
*B60N 2/894* (2018.01)

(52) U.S. Cl.
CPC ............ *B60N 2/894* (2018.02); *B60N 2/914* (2018.02); *B60N 2/976* (2018.02); *B60N 2/99* (2018.02)

(58) Field of Classification Search
CPC . B60N 2/803; B60N 2/64; B60N 2/60; B60N 2/643; B60N 2/986; B60N 2002/5808
See application file for complete search history.

(56) References Cited

U.S. PATENT DOCUMENTS

| | | | | |
|---|---|---|---|---|
| D219,813 S * | 2/1971 | McQueen | ............... | 297/DIG. 2 |
| 3,581,620 A * | 6/1971 | Hauck | ............... | B64D 11/06 89/36.11 |
| 3,729,228 A * | 4/1973 | Inoue | ............... | B60N 2/803 297/396 |
| D234,033 S * | 1/1975 | Tarbet | ............... | D6/356 |
| 4,105,245 A * | 8/1978 | Simons | ............... | B60N 2/045 296/65.09 |
| 4,169,626 A * | 10/1979 | Hollar, Jr. | ............... | B60N 2/2358 297/365 |
| 4,506,477 A * | 3/1985 | Castle | ............... | A47H 1/022 160/90 |
| 4,549,766 A * | 10/1985 | Nishino | ............... | B60N 2/803 297/396 |
| 4,626,028 A * | 12/1986 | Hatsutta | ............... | B60N 2/2222 297/284.1 |
| 4,746,168 A * | 5/1988 | Bracesco | ............... | B60N 2/5816 297/284.11 |
| 4,865,110 A * | 9/1989 | Seal | ............... | A01K 3/00 160/332 |
| 5,120,109 A * | 6/1992 | Rangoni | ............... | B60N 2/1803 297/284.3 |
| 5,156,440 A * | 10/1992 | Vidwans | ............... | B60N 2/815 297/410 |
| 5,378,043 A * | 1/1995 | Viano | ............... | B60N 2/838 297/408 |
| 5,441,331 A * | 8/1995 | Vento | ............... | B60N 2/10 297/452.33 |
| 5,505,520 A * | 4/1996 | Frusti | ............... | B60N 2/6671 297/284.4 |
| 5,713,634 A * | 2/1998 | Koike | ............... | B60N 2/643 297/378.13 |
| 5,758,924 A * | 6/1998 | Vishey | ............... | A47C 7/467 297/284.4 |
| 5,810,446 A * | 9/1998 | Tadokoro | ............... | B60N 2/686 297/452.18 |
| 5,829,838 A * | 11/1998 | Offenbacher | ............... | B60N 2/6009 297/408 |
| 5,836,651 A * | 11/1998 | Szerdahelyi | ............... | B60N 2/2222 297/410 |
| 6,199,947 B1 * | 3/2001 | Wiklund | ............... | B60N 2/838 297/216.12 |
| 6,578,917 B1 * | 6/2003 | Aubert | ............... | B60N 2/002 297/317 |
| 6,789,846 B2 * | 9/2004 | Humer | ............... | B60N 2/4228 297/216.12 |
| 6,817,673 B2 * | 11/2004 | Walker | ............... | B60N 2/002 297/440.2 |
| 6,908,151 B2 * | 6/2005 | Meeker | ............... | B60N 2/2806 297/250.1 |
| D513,894 S * | 1/2006 | Juraschek | ............... | D6/356 |
| 6,994,401 B1 | 2/2006 | Fischer et al. | | |
| 7,021,706 B2 * | 4/2006 | Aufrere | ............... | B60N 2/42745 297/216.13 |
| 7,040,707 B2 | 5/2006 | Nakahara | | |
| D532,211 S * | 11/2006 | Su | ............... | D6/366 |
| D536,185 S * | 2/2007 | Ritzel | ............... | D6/356 |
| 7,237,847 B2 * | 7/2007 | Hancock | ............... | B60N 2/0228 297/284.4 |
| 7,246,852 B2 * | 7/2007 | Balensiefer | ............... | B60N 2/2851 297/250.1 |
| 7,318,626 B2 * | 1/2008 | Ohchi | ............... | B60N 2/682 297/410 |
| D574,619 S * | 8/2008 | Maezono | ............... | D6/356 |
| D587,025 S * | 2/2009 | Juraschek | ............... | D6/356 |
| 7,510,242 B2 * | 3/2009 | Yumoto | ............... | B60N 2/2806 297/250.1 |
| 7,543,888 B2 * | 6/2009 | Kuno | ............... | B60N 2/0232 297/353 |
| 7,600,821 B2 * | 10/2009 | Yasuda | ............... | A47C 1/02 297/452.29 |
| 7,611,199 B2 * | 11/2009 | Michalak | ............... | B60N 2/0232 297/300.2 |
| D612,623 S * | 3/2010 | Smit | ............... | D6/366 |
| 7,708,343 B2 * | 5/2010 | Kayumi | ............... | B60N 2/99 297/284.9 |
| D619,045 S * | 7/2010 | Fujita | ............... | D12/1 |
| 7,753,451 B2 * | 7/2010 | Maebert | ............... | B60N 2/686 297/344.11 |
| 7,992,933 B2 * | 8/2011 | Yetukuri | ............... | B60N 2/4228 297/216.12 |
| D652,642 S * | 1/2012 | Etienne | ............... | D6/356 |
| D657,579 S * | 4/2012 | Klein | ............... | D6/356 |
| D665,181 S * | 8/2012 | Crepeau | ............... | D6/356 |
| D685,586 S * | 7/2013 | Klein | ............... | D6/356 |
| 8,474,908 B2 * | 7/2013 | Petzel | ............... | B60N 2/5621 297/284.3 |
| D696,035 S * | 12/2013 | Hatter | ............... | D6/356 |
| 8,702,175 B2 * | 4/2014 | Funaki | ............... | B60N 2/4228 297/452.37 |
| 8,727,374 B1 * | 5/2014 | Line | ............... | B60R 21/207 280/728.3 |
| 8,783,780 B2 * | 7/2014 | Hoshi | ............... | B60N 2/0232 297/452.18 |
| D710,119 S * | 8/2014 | Tilscher | ............... | D6/356 |
| 8,876,206 B2 * | 11/2014 | Yamaguchi | ............... | B60N 2/4228 297/230.12 |
| 8,894,154 B2 * | 11/2014 | Kulkarni | ............... | B60N 2/682 297/452.1 |
| D718,562 S * | 12/2014 | Menne, III | ............... | D6/716.4 |
| 8,936,317 B2 * | 1/2015 | Yamaguchi | ............... | B60N 2/4228 297/452.31 |
| D721,895 S * | 2/2015 | Beermann | ............... | D6/356 |
| D721,896 S * | 2/2015 | Ritzel | ............... | D6/356 |
| D721,897 S * | 2/2015 | Ritzel | ............... | D6/356 |
| 9,278,634 B2 | 3/2016 | Mathews et al. | | |
| D767,292 S * | 9/2016 | Line | ............... | D6/356 |
| 9,493,095 B2 * | 11/2016 | Koike | ............... | B60N 2/643 |
| 9,676,311 B2 * | 6/2017 | Murolo | ............... | B60N 2/68 |
| D804,205 S * | 12/2017 | Godard | ............... | D6/356 |
| 9,845,032 B1 * | 12/2017 | Line | ............... | B60N 2/5858 |
| D808,181 S * | 1/2018 | Gay | ............... | D6/333 |
| 9,889,773 B2 * | 2/2018 | Line | ............... | B60N 2/2222 |
| D817,652 S * | 5/2018 | Nunn | ............... | D6/356 |
| D820,626 S * | 6/2018 | Donadei | ............... | D6/716.4 |
| 9,994,321 B2 * | 6/2018 | Murnan | ............... | B64D 11/06 |
| 10,046,682 B2 * | 8/2018 | Llne | ............... | B60N 2/686 |
| 10,081,282 B2 * | 9/2018 | Line | ............... | B60N 2/80 |
| 10,086,722 B2 * | 10/2018 | Denbo | ............... | B60N 2/2884 |
| 10,166,894 B2 * | 1/2019 | Line | ............... | B60N 2/5621 |
| D839,622 S * | 2/2019 | Oyama | ............... | D6/356 |
| D841,349 S * | 2/2019 | Pinder | ............... | D6/356 |
| D841,350 S * | 2/2019 | Smith | ............... | D6/356 |
| 2003/0006640 A1 | 1/2003 | Yasuda et al. | | |
| 2003/0038517 A1 * | 2/2003 | Moran | ............... | B60N 2/914 297/284.3 |
| 2003/0222492 A1 * | 12/2003 | Nemoto | ............... | B60N 2/818 297/410 |
| 2005/0168041 A1 * | 8/2005 | Glance | ............... | B60N 2/68 297/452.18 |
| 2005/0179290 A1 * | 8/2005 | Hancock | ............... | B60N 2/0228 297/284.4 |

(56) References Cited

U.S. PATENT DOCUMENTS

| | | | |
|---|---|---|---|
| 2005/0225155 A1* | 10/2005 | Nakahara | B60N 2/5621 297/452.42 |
| 2006/0006709 A1* | 1/2006 | Uno | B60N 2/809 297/216.12 |
| 2006/0082208 A1* | 4/2006 | Beermann | B60N 2/22 297/452.11 |
| 2006/0152062 A1* | 7/2006 | Archambault | B60N 2/80 297/452.34 |
| 2008/0088168 A1* | 4/2008 | Beermann | B60N 2/20 297/354.12 |
| 2008/0136237 A1 | 6/2008 | Kayumi et al. | |
| 2008/0136240 A1* | 6/2008 | Matthews | B60N 2/4235 297/354.1 |
| 2008/0217971 A1* | 9/2008 | Paluch | B60N 2/838 297/216.12 |
| 2009/0184557 A1* | 7/2009 | Runde | B60N 2/815 297/410 |
| 2010/0026077 A1* | 2/2010 | Tarumi | A47C 7/021 297/452.62 |
| 2010/0207431 A1* | 8/2010 | Petzel | B60N 2/5621 297/180.16 |
| 2010/0301649 A1* | 12/2010 | Mathews | B60N 2/66 297/284.2 |
| 2011/0057498 A1* | 3/2011 | Fujita | B60N 2/0705 297/452.18 |
| 2011/0285189 A1* | 11/2011 | Petzel | B60N 2/56 297/284.1 |
| 2012/0280552 A1* | 11/2012 | Line | B60N 2/809 297/440.1 |
| 2012/0299342 A1* | 11/2012 | Mizobata | B60N 2/6009 297/216.1 |
| 2013/0119646 A1* | 5/2013 | Tracht | B60R 21/207 280/730.1 |
| 2013/0207436 A1* | 8/2013 | Bagin | B60N 2/682 297/391 |
| 2013/0320742 A1* | 12/2013 | Murolo | B60N 2/68 297/452.18 |
| 2013/0341991 A1* | 12/2013 | Matsuzaki | B60N 2/68 297/452.18 |
| 2014/0032043 A1* | 1/2014 | Line | B60N 2/976 701/36 |
| 2014/0232158 A1* | 8/2014 | Sano | B60N 2/68 297/354.1 |
| 2014/0354025 A1* | 12/2014 | Ishimoto | B60N 2/68 297/408 |
| 2015/0045984 A1 | 2/2015 | Hui et al. | |
| 2015/0145313 A1* | 5/2015 | Lee | B60N 2/682 297/452.18 |
| 2015/0165935 A1* | 6/2015 | Sachs | B60N 2/22 297/342 |
| 2015/0165949 A1* | 6/2015 | Tobata | B60N 2/16 297/338 |
| 2015/0175042 A1* | 6/2015 | Galbreath | B60N 2/5825 297/452.48 |
| 2015/0291072 A1* | 10/2015 | Ito | B60N 2/72 297/452.2 |
| 2015/0343929 A1* | 12/2015 | Yasuda | B60N 2/646 297/452.18 |
| 2016/0009209 A1* | 1/2016 | Cao | B60N 2/58 297/354.12 |
| 2016/0096461 A1* | 4/2016 | Coppuck | B60N 2/68 297/354.1 |
| 2016/0200232 A1* | 7/2016 | Tamura | B60N 2/80 297/452.18 |
| 2016/0288678 A1* | 10/2016 | Berry | B60N 2/565 |
| 2016/0297337 A1* | 10/2016 | White | B60N 2/2209 |
| 2017/0113642 A1* | 4/2017 | Inoue | F16B 45/00 |
| 2017/0210256 A1* | 7/2017 | Kondrad | B60N 2/879 |
| 2017/0341622 A1* | 11/2017 | Mizobata | B60N 2/68 |
| 2017/0355291 A1* | 12/2017 | Line | B60N 2/68 |
| 2017/0368960 A1* | 12/2017 | Whitmore | B60N 2/56 |
| 2018/0037148 A1* | 2/2018 | Line | B60N 2/809 |
| 2018/0126883 A1* | 5/2018 | Sakaguchi | B60N 2/0232 |
| 2018/0186257 A1* | 7/2018 | Kondrad | B60N 2/882 |
| 2018/0186259 A1* | 7/2018 | Line | B60N 2/882 |

FOREIGN PATENT DOCUMENTS

| | | |
|---|---|---|
| DE | 102013225477 A1 | 3/2015 |
| DE | 102014222403 A1 | 5/2015 |
| DE | 102015205306 A1 | 10/2015 |
| DE | 102015202629 A1 | 4/2016 |
| EP | 1795393 B1 | 1/2009 |
| EP | 2060438 A2 | 5/2009 |
| EP | 2783910 A1 | 10/2014 |
| EP | 2837529 A1 | 2/2015 |
| JP | S6143454 U | 3/1986 |
| KR | 101565576 B1 | 11/2015 |
| KR | 20150146000 A | 12/2015 |
| WO | 2015054047 A1 | 4/2015 |

OTHER PUBLICATIONS

German Office Action for Application No. 10 2016 215 048.0, dated Nov. 14, 2019, 9 pages.

Chinese Office Action for Application No. 201710388591.8, dated Jan. 21, 2020, 9 pages.

* cited by examiner

INTEGRATED SEAT BACK SUPPORT MEMBER FOR SEAT ASSEMBLIES

CROSS-REFERENCE TO RELATED APPLICATIONS

This application claims foreign priority benefits under 35 U.S.C. § 119(a)-(d) to DE 10 2016 215 048.0, filed Aug. 12, 2016, the disclosure of which is hereby incorporated by reference in their entirety.

TECHNICAL FIELD

The various embodiments relate to seat assemblies and seat back support members for seat assemblies.

BACKGROUND

Yetukuri et al. U.S. Pat. No. 7,992,933 B2 discloses an integrated vehicle seat.

SUMMARY

According to at least one embodiment, a seat back support member is provided with a primary substrate sized to be received upon an upper cross member and a pair of side members of a seat back frame to support a back of an occupant. A pair of receptacles is formed through the primary substrate to receive a pair of posts that extend from the upper cross member of the seat back frame. A secondary substrate extends from the primary substrate to support a head of the occupant.

According to at least another embodiment, a seat assembly is provided with a seat back frame. A seat back support member comprises a primary substrate sized to be received upon an upper cross member and a pair of side members of the seat back frame to support a back of an occupant. A pair of receptacles is formed through the primary substrate to receive a pair of posts that extend from the upper cross member of the seat back frame. A secondary substrate extends from the primary substrate to support a head of the occupant.

According to at least another embodiment, a seat assembly is provided with a seat back frame with a pair of side members and an upper cross member. A seat back support member is disposed upon the upper cross member and the pair of side members to support a back of an occupant, with a pair of apertures formed therethrough oriented proximate to the upper cross member of the seat back frame. A pair of posts is affixed to the upper cross member. The pair of posts is sized to receive a head restraint assembly upon the posts for translation upon the pair of posts. The pair of posts extends through the pair of apertures in the seat back support member.

According to at least another embodiment, a method of assembling a seat assembly provides a seat back frame with a pair of posts affixed to an upper cross member of the seat back frame. A determination is made whether the seat assembly comprises one of an adjustable head restraint assembly and an integrated head restraint. The adjustable head restraint assembly is assembled upon the pair of posts in response to determining that the seat assembly comprises the adjustable head restraint assembly. A seat back support member with a pair of apertures formed therethrough is assembled upon the upper cross member with the pair of posts received in the pair of apertures, in response to determining that the seat assembly comprises the integrated head restraint.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
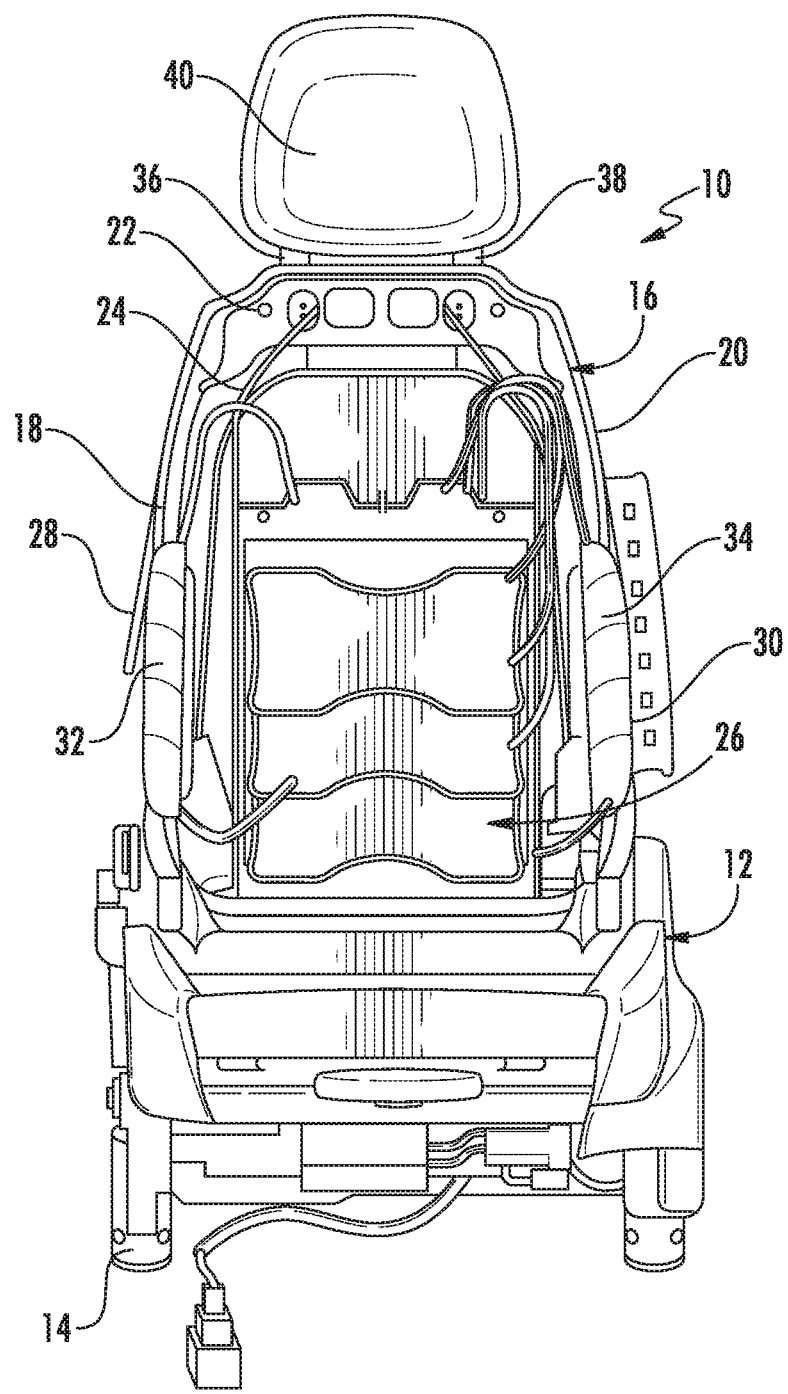
FIG. 1 is a front elevation view of a seat assembly according to an embodiment.

FIG. 1 illustrates a seat assembly 10 according to an embodiment. The seat assembly 10 is illustrated without a seat back cover and without seat back cushioning to reveal underlying components. The seat assembly 10 is depicted as a vehicle seat assembly for automobile seating, or aircraft seating. However, the seat assembly 10 may be embodied in various seating applications, such as an office chair, a comfort chair or the like.

The seat assembly 10 includes a seat bottom 12 with brackets 14 to be mounted to a vehicle body, such as an automobile body. A seat back frame 16 is pivotally mounted to the seat bottom 12 to extend upright from the seat bottom 12. The seat back frame 16 is pivotally adjustable relative to the seat bottom 12 for user selection of various recline positions of the seat back frame 16. Alternatively, the seat back frame 16 may be pivotally support by the vehicle body to extend adjacent to the seat bottom 12.

The seat back frame 16 is formed from stamped metal components that are welded or otherwise fastened or adhered together. The seat back frame 16 includes a pair of side members 18, 20 and an upper cross member 22.

Figure 2:
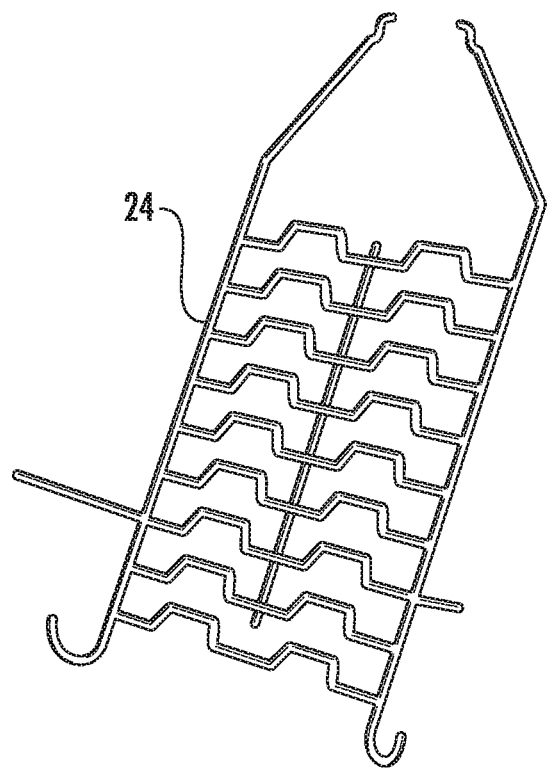
FIG. 2 is a perspective view of a wire suspension of the seat assembly of FIG. 1.

A wire mat suspension 24 is supported upon the seat back frame 16 as is known in the art. The wire mat suspension 24 is illustrated disassembled from the seat assembly 10 in FIG. 2. Referring again to FIG. 1, an air bladder assembly 26 is supported upon the wire mat suspension 24 to provide various support and comfort features to the occupant, such as adjustable support and massage functions. Valves, controls and wiring associated with the air bladder assembly 26 or other seating components may be supported upon the wire mat suspension 24, or supported upon the seat back frame 16.

Figure 3:
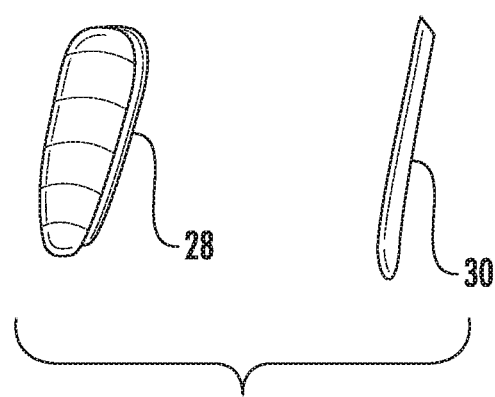
FIG. 3 is an exploded perspective view of a pair of side bolster support members of the seat assembly of FIG. 1.

A pair of polymeric side supports 28, 30 are each provided on one of the side members 18, 20 of the seat back frame 16. The side supports 28, 30 are illustrated removed from the seat assembly 10 in FIG. 3. Referring again to FIG. 1, the side supports 28, 30 receive a pair of side bolster air bladders 32, 34, which are provided in the seat assembly 10 to provide comfort, support and massage functions as prescribed in a particular application.

A pair of posts 36, 38 is mounted to the upper cross member 22 of the seat back frame 16. A head restraint 40 is supported upon the pair of posts 36, 38. According to one embodiment, the pair of posts 36, 38 is affixed to the upper cross member 22; and the head restraint 40 is adjustable along a length of the pair of posts 36, 38 as is known in the art. According to another embodiment, the head restraint 40 is affixed to the pair of posts 36, 38; and the pair of posts 36, 38 is adjustable relative to the upper cross member 22.

Figure 4:
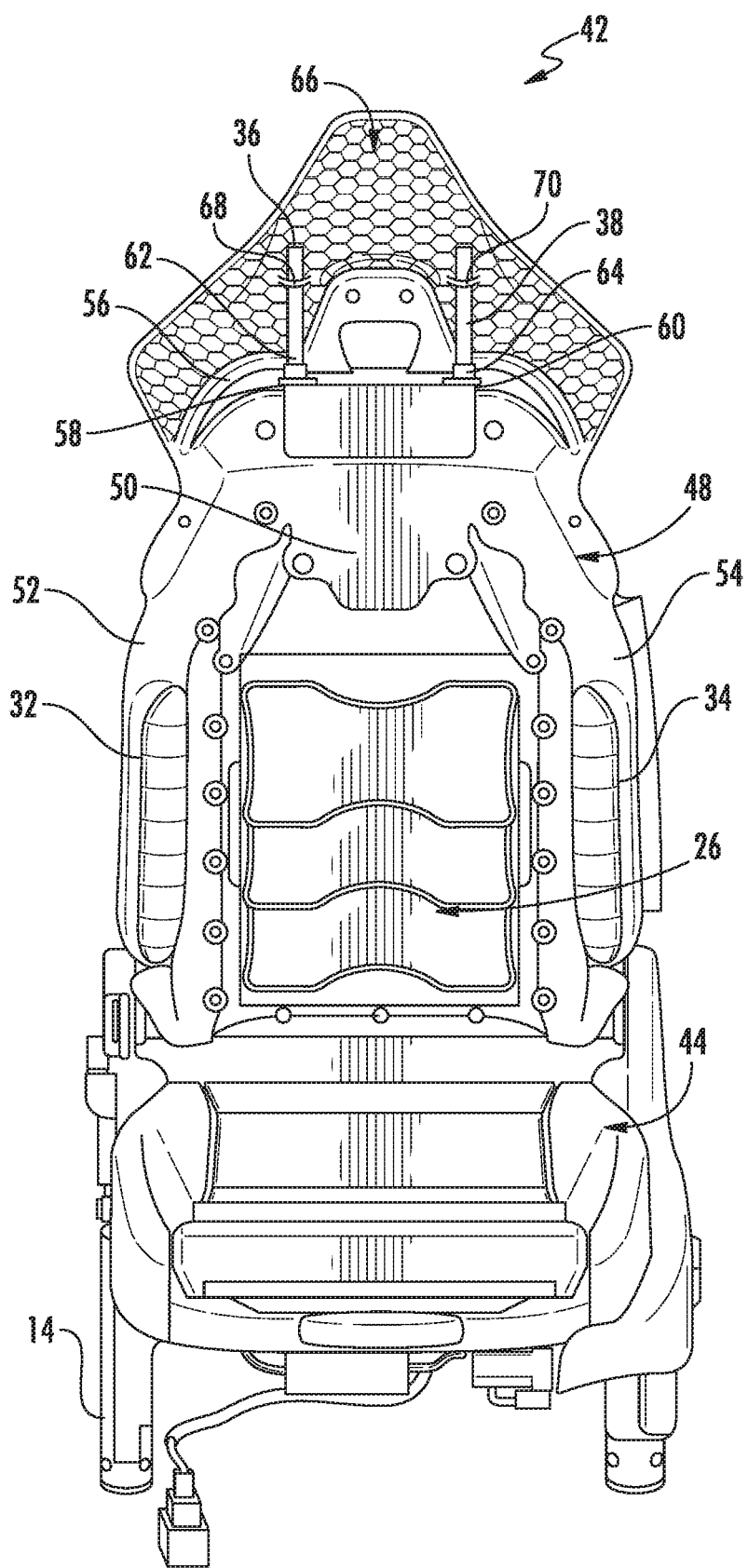
FIG. 4 is front elevation view of a seat assembly according to another embodiment.

The seat assembly 10 is depicted as a standard or conventional style seat assembly 10. FIG. 4 illustrates another seat assembly 42 according to an embodiment. The seat assembly 42 is illustrated without a seat back cover and without seat back cushioning to reveal underlying components. Some seating applications utilize an integrated or sport seat assembly, such as the seat assembly 42. Sport seat assemblies of the prior art are often costly due to limited volume and specialized design. In order to minimize such costs, the integrated seat assembly 42 employs various common components with the conventional seat assembly 10 of FIG. 1.

Similar to the prior embodiment, the integrated seat assembly 42 is depicted as a vehicle seat assembly for automobile seating, or aircraft seating. However, the seat assembly 42 may be embodied in various seating applications, such as an office chair, a comfort chair or the like.

The integrated seat assembly 42 includes a seat bottom 44. The seat bottom 44 may be common with the seat bottom 12 of the conventional seat assembly 10, or may be specific for the integrated seat assembly 42. Other common features are assigned the same reference numerals. The seat bottom 44 includes brackets 14 to be mounted to a vehicle body, such as an automobile body.

A seat back frame 16 is pivotally mounted to the seat bottom 44 to extend upright from the seat bottom 44. The seat back frame 16 includes a pair of side members 18, 20 and an upper cross member 22, which are concealed in FIG. 4. A pair of posts 36, 38 is mounted to the upper cross member 22 of the seat back frame 16. The seat back frame 16, and posts 36, 38 are common to both styles of seat assemblies 10, 42 for standardization and modularity.

Figure 5:
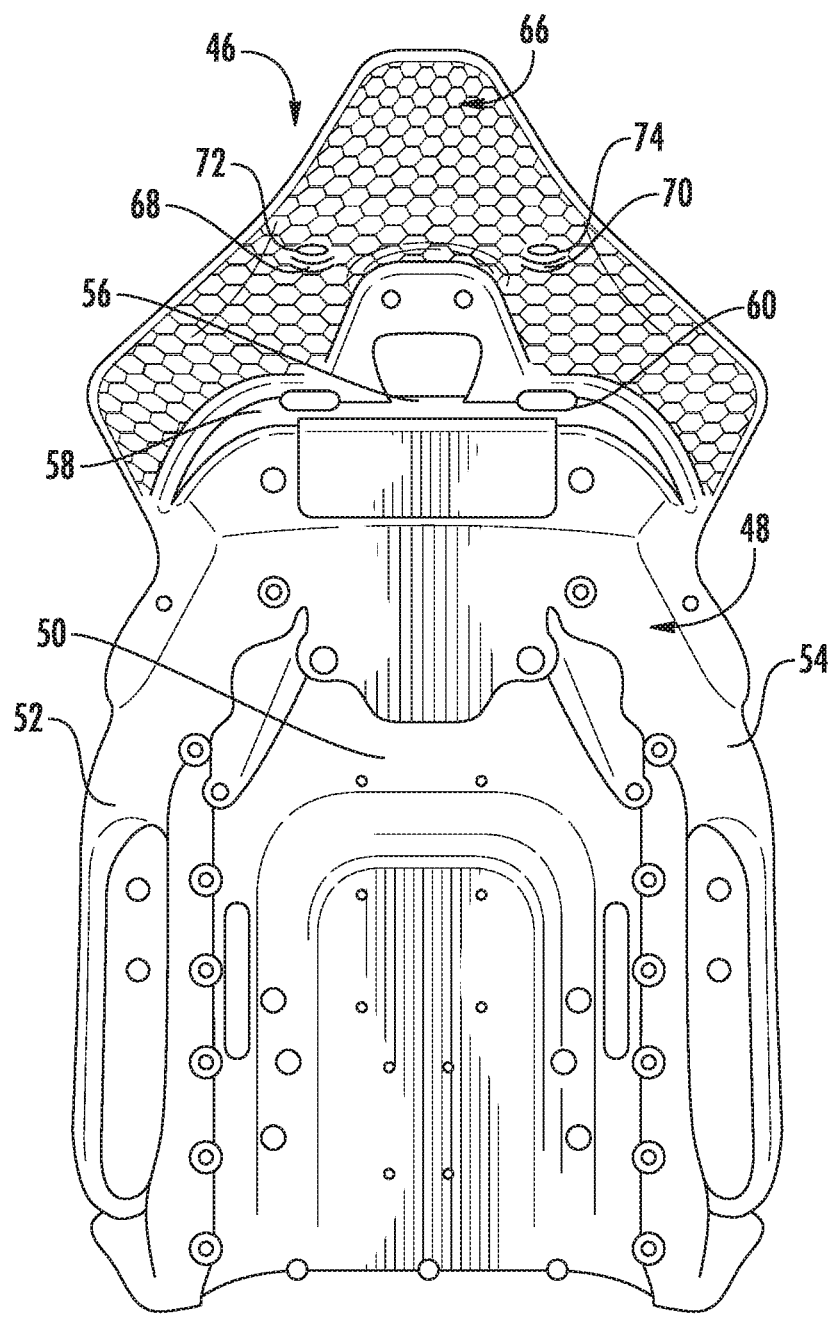
FIG. 5 is a front elevation view of seat back support member of the seat assembly of FIG. 4.

The integrated seat assembly 42 includes a function carrier such as a seat back support member 46. The seat back support member 46 is a unitary molded shell, which is illustrated disassembled from the seat assembly 42 in FIG. 5. With reference to FIGS. 4 & 5, the seat back support member includes a primary substrate 48 that is generally concave and sized to be received upon the seat back frame 16. The primary substrate 48 includes a panel 50 spanning the seat back frame 16 and sized to receive and support a back of an occupant. The panel 50 spans laterally to a pair of spaced apart side bolster support members 52, 54. The pair of side bolster support members are each supported upon one of the side members 18, 20 of the seat back frame 16.

The panel 50 of the primary substrate 48 of the seat back support member 46 extends upward against a forward surface of the upper cross member 22 of the seat back frame 16. A brace 56 is formed integral with the seat back support member 46. The brace 56 extends in an aft direction from the panel 50 to mount upon the upper cross member 22 of the seat back frame 16. A pair of apertures 58, 60 is formed through the brace 56, aligned with the posts 36, 38 of the seat back frame 16. The apertures 58, 60 may be slotted transversely as depicted in FIG. 5 to accommodate various post alignments and tolerances. Referring again to FIG. 4, a pair of guide receptacles 62, 64 is received in the pair of apertures 58, 60. The guide receptacles 62, 64 receive the pair of posts 36, 38 that extend through the brace 56 for alignment and attachment of the seat back support member 46 upon the seat back frame 16.

The seat back support member 46 also includes an integral secondary substrate 66 that extends upward from the brace 56. The secondary substrate 66 is also concave and sized to support a head of the occupant. A pair of brackets 68, 70 extends forward from the secondary substrate 66, which are also formed integral with the seat back support member 46. An aperture or receptacle 72, 74 (FIG. 5) is formed in each of the pair of brackets 68, 70 to each receive one of the posts 36, 38. The receptacles 72, 74 provide additional alignment to the seat back support member 46 upon the seat back frame 16. The cooperation of the brackets 68, 70 with the posts 36, 38 provide additional structural support to the secondary substrate 66 by structurally supporting the secondary substrate 66 by the seat back frame 16. After assembly, cushioning (not shown) and a cover (not shown) are provided on the secondary substrate 66 as an integral head restraint.

With continued reference to FIG. 4, an air bladder assembly 26 is supported on the primary substrate 48. A pair of side bolster air bladders 32, 34 is mounted upon the side bolster support members 52, 54. Valves, controls, and wiring associated with the air bladder assembly 26 and the pair of side bolster air bladders 32, 34 may be supported upon the seat back support member 46, or supported upon the seat back frame 16. The air bladder assembly 26 and the pair of side bolster support members 52, 54 provide comfort, support and massage features.

The integrated seat assembly 42 provides increased comfort with a contoured seat with improved contact to a seated occupant by equalizing occupant load. The seat back support member 46 permits a standardized seat back frame 16 for interchangeability of the seat back support member 46 with the head restraint 40, the wire suspension 24, and the side supports 28, 30 of the conventional seat assembly 10. Thus, these four components, 24, 28, 30, 40 are omitted in the integrated seat assembly 42. The integrated seat assembly 42 incorporates the functional features in the seat back 16, 46, as the seat back 16 of the conventional seat assembly 10 while providing enhanced load distribution.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A unitary seat back support member comprising:
   a primary substrate sized to be received upon an upper cross member and a pair of side members of a seat back frame to support a back of an occupant;
   a pair of receptacles formed integrally with the primary substrate to receive a pair of posts that extend from the upper cross member of the seat back frame; and
   a secondary substrate formed integrally with and extending upward from the primary substrate to receive and support a head of the occupant thereby omitting a separate head restraint from the pair of posts, such that the primary substrate, the secondary substrate and the pair of receptacles provide the unitary seat back support member.

2. The unitary seat back support member of claim 1 wherein the pair of receptacles are formed in the secondary substrate.

3. The unitary seat back support member of claim 1 further comprising a pair of brackets extending in a fore-aft direction from the secondary substrate, and wherein the pair of receptacles is each formed through one of the pair of brackets.

4. The unitary seat back support member of claim 1 further comprising a brace formed integrally with the primary substrate and the secondary substrate and extending in a fore-aft direction from the primary substrate to engage the upper cross member of the seat back frame.

5. The unitary seat back support member of claim 4 wherein the pair of receptacles are oriented through the brace.

6. The unitary seat back support member of claim 5 wherein the pair of receptacles are further defined as a first pair of receptacles; and
wherein a second pair of receptacles are formed in the secondary substrate to receive the pair of posts.

7. The unitary seat back support member of claim 1 wherein the primary substrate is generally concave; and
wherein the unitary seat back support member further comprises a pair of side bolster support members extending from the primary substrate.

8. A seat assembly comprising:
a seat back frame comprising an upper cross member, a pair of side members, and a pair of posts extending from the upper cross member; and
a unitary seat back support member according to claim 1 installed upon the seat back frame with the primary substrate received upon the upper cross member and the pair of side members, and with the pair of posts received within the pair of receptacles.

9. A seat assembly comprising:
a seat back frame with a pair of side members and an upper cross member;
a unitary seat back support member disposed upon the upper cross member and the pair of side members to support a back of an occupant, with a pair of apertures formed through the unitary seat back support member oriented proximate to the upper cross member of the seat back frame; and
a pair of posts mounted to the upper cross member, the pair of posts being sized to receive a head restraint assembly upon the pair of posts, the pair of posts extending through the pair of apertures in the seat back support member;
wherein the unitary seat back support member comprises:
a primary substrate received upon the upper cross member and the pair of side members thereby omitting a separate suspension mounted to seat back frame to support the back of the occupant, and
a secondary substrate formed integrally with and extending upward from the primary substrate to receive and support a head of the occupant.

10. The seat assembly of claim 9 wherein the unitary seat back support member further comprises a brace formed integrally with the primary substrate and the secondary substrate and extending in a fore-aft direction from the primary substrate to the secondary substrate in engagement upon the upper cross member of the seat back frame.

11. The seat assembly of claim 10 wherein the pair of apertures are formed through the brace.

12. The seat assembly of claim 9 further comprising a pair of brackets extending in a fore-aft direction from the secondary substrate, and wherein a receptacle is formed through each of the pair of brackets.

13. The seat assembly of claim 9 wherein the primary substrate is generally concave.

14. The seat assembly of claim 13 further comprising a pair of side bolster support members extending from the primary substrate.

15. The seat assembly of claim 9 further comprising an air bladder assembly supported on the unitary seat back support member.

16. The seat assembly of claim 9 wherein the unitary seat back support member is formed from a polymeric material.

17. The unitary seat back support member of claim 1 wherein the secondary substrate is not adjustable relative to the primary substrate.

18. The unitary seat back support member of claim 1 wherein the primary substrate further comprises a panel spanning across the pair of side members from the upper cross member and along a length of the pair of side members and sized to receive and support the back of the occupant.

19. The seat assembly of claim 9 wherein the secondary substrate is not adjustable relative to the primary substrate.

20. The seat assembly of claim 9 wherein the unitary seat back support member with the secondary substrates omits a separate head restraint from the pair of posts.

* * * * *